United States Patent
Eitan

(10) Patent No.: US 10,057,942 B2
(45) Date of Patent: Aug. 21, 2018

(54) DATA TRANSFER USING NON-RADIO FREQUENCY (RF) AND RF SIGNALS

(71) Applicant: QUALCOMM Incorporated, San Diego, CA (US)

(72) Inventor: Alecsander Petru Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 14/664,454

(22) Filed: Mar. 20, 2015

(65) Prior Publication Data

US 2016/0278161 A1    Sep. 22, 2016

(51) Int. Cl.
| | |
|---|---|
| H04W 4/00 | (2018.01) |
| H04W 88/06 | (2009.01) |
| H04W 12/06 | (2009.01) |
| H04B 11/00 | (2006.01) |
| H04W 76/10 | (2018.01) |
| H04W 84/12 | (2009.01) |

(52) U.S. Cl.
CPC ............ *H04W 88/06* (2013.01); *H04B 11/00* (2013.01); *H04W 12/06* (2013.01); *H04W 76/10* (2018.02); *H04W 84/12* (2013.01)

(58) Field of Classification Search
CPC ................................ H04W 4/008; H04B 11/00
See application file for complete search history.

(56) References Cited

U.S. PATENT DOCUMENTS

| | | | |
|---|---|---|---|
| 8,854,985 B2 | 10/2014 | Tsfaty | |
| 9,621,645 B2* | 4/2017 | Smus | .................... H04L 67/104 |
| 2006/0282649 A1* | 12/2006 | Malamud | ............ H04L 63/0861 |
| | | | 712/26 |
| 2007/0001853 A1* | 1/2007 | Otranen | ............... G06K 7/0008 |
| | | | 340/572.1 |
| 2007/0010200 A1 | 1/2007 | Kaneko | |
| 2007/0275702 A1 | 11/2007 | Hwang | |
| 2008/0121687 A1* | 5/2008 | Buhot | .................... G06Q 20/32 |
| | | | 235/375 |
| 2008/0311944 A1* | 12/2008 | Hansen | ..................... G01S 1/02 |
| | | | 455/517 |
| 2010/0110837 A1* | 5/2010 | Jung | ...................... H04B 11/00 |
| | | | 367/137 |

(Continued)

FOREIGN PATENT DOCUMENTS

WO    WO-2014083709 A1    6/2014

OTHER PUBLICATIONS

BDTI (Start up Naratte Launches Novel Ultrasonic Near-Field Communication Solution, Jul. 28, 2011, pp. 1-2) Source: http://www.bdti.com/InsideDSP/2011/07/28/Naratte.*

(Continued)

*Primary Examiner* — Maharishi V Khirodhar
(74) *Attorney, Agent, or Firm* — Patterson & Sheridan, L.L.P.

(57) ABSTRACT

Certain aspects of the present disclosure provide methods and apparatuses for wireless communications between devices. An example method generally includes obtaining, via a non-audible signal, identification information, and using the identification to establish a connection, via a radio access technology (RAT), with a second device for transferring data between the first device and the second device via the RAT.

30 Claims, 7 Drawing Sheets

(56) References Cited

U.S. PATENT DOCUMENTS

| | | | |
|---|---|---|---|
| 2011/0319016 A1* | 12/2011 | Gormley | H04B 5/0012 |
| | | | 455/41.1 |
| 2013/0070297 A1* | 3/2013 | Kato | H04N 1/00217 |
| | | | 358/1.15 |
| 2014/0099888 A1 | 4/2014 | Flanagan et al. | |
| 2014/0160880 A1* | 6/2014 | King | H04B 11/00 |
| | | | 367/2 |
| 2014/0258392 A1* | 9/2014 | Barth | H04L 63/0492 |
| | | | 709/204 |
| 2015/0043429 A1* | 2/2015 | Kim | H04W 4/008 |
| | | | 370/328 |
| 2015/0310416 A1 | 10/2015 | Akashika et al. | |
| 2015/0327045 A1* | 11/2015 | Chang | H04W 8/005 |
| | | | 370/329 |
| 2015/0348003 A1* | 12/2015 | Reader | G06Q 20/3224 |
| | | | 705/16 |

OTHER PUBLICATIONS

UBDTI (Start up Naratte Launches Novel Ultrasonic Near-Field Communication Solution, Jul. 28, 2011, pp. 1-2) Source: http://www.bdti.com/InsideDSP/2011/07/28/Naratte.*
UBDTI (Start up Naratte Launches Novel Ultrasonic Near-Field Communication Solution, Jul. 28, 2011, pp. 1-2).*
BDTI (startup narrate launches novel ultrasonic near-field communications solution, Jul. 28, 2011, p. 1-2) (Year: 2011).*
Jayantilal S.H., "Ultrasonic Sensor System on Linux OS using Bluetooth Communication," IJSTE—International Journal of Science Technology & Engineering, Aug. 2014, vol. 1 (2), pp. 23-28.
International Search Report and Written Opinion—PCT/US2016/017991—ISA/EPO—dated Apr. 26, 2016.

\* cited by examiner

DATA TRANSFER USING NON-RADIO FREQUENCY (RF) AND RF SIGNALS

BACKGROUND

Field

Certain aspects of the present disclosure generally relate to wireless communications and, more particularly, to using ultrasonic (or near-ultrasonic) and radio frequency signals for data transfer.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

SUMMARY

Certain aspects of the present disclosure provide an apparatus for wireless communications. The apparatus typically includes a first interface configured to obtain, via a non-radio frequency signal, identification information; a second interface for communicating via a radio frequency signal; and a processing system configured to use the identification information to establish a connection with the second device, via the second interface, and transfer the data between the first and second devices via the second interface.

Certain aspects of the present disclosure provide an apparatus for wireless communications. The apparatus typically includes a first interface configured to output, via a non-radio frequency signal, identification information; a second interface configured to obtain, via a radio frequency signal, a request for communicating with the first device, the request including the identification information; and a processing system configured to establish a connection with the second device, via the second interface, and transfer data between the first and second devices via the second interface.

Certain aspects of the present disclosure also provide various apparatus, methods, and computer program products for performing the operations described above.

DETAILED DESCRIPTION

Figure 1:
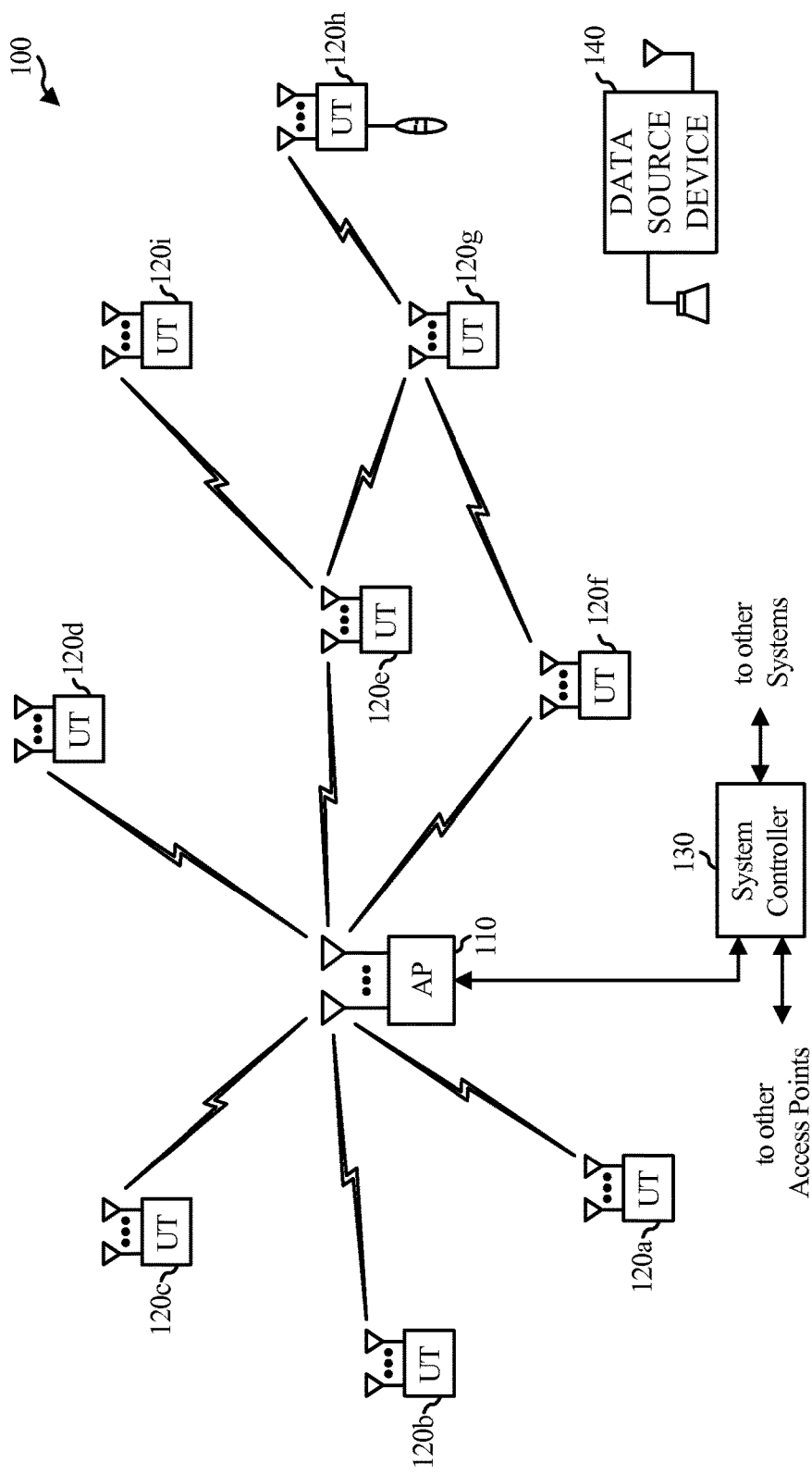
FIG. 1 illustrates a diagram of an example wireless communications network, in accordance with certain aspects of the present disclosure.

Aspects of the present disclosure provide techniques for using information received from a non-radio frequency signal (e.g., a signal transmitted at ultrasonic or near ultrasonic frequencies) to connect with and perform data transmission between devices using a radio access technology.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

FIG. 1 illustrates a wireless system 100 with access points and user terminals in which aspects of the present disclosure may be practiced. Wireless system 100 may, but need not, implement multiple-input multiple-output capabilities for communications between AP 110, UTs 120, and data source device 140. User terminals (hereinafter "UT") 120 may be configured to perform or direct operations 500 in FIG. 5 to obtain identification information, via a non-radio frequency signal, from another UT and use the identification information to establish a connection with another UT for transferring data between the UTs via radio frequency signals. UTs 120 may also be configured to perform or direct operations 600 in FIG. 6 to transmit information usable by another UT to initiate a connection with the UT and communicate with another UT for transferring data via radio frequency signals.

For simplicity, only one access point 110 is shown in FIG. 1. An access point AP may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. As used herein, the term AP generally refers to a station that communicates with the user terminals and may also be referred to as a base station or some other terminology.

A user terminal may be fixed or mobile and may comprise, be implemented as, or known as a subscriber station, a subscriber unit, a mobile station (MS), a remote station, a remote terminal, an access terminal (AT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

AP 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

Some UTs, as illustrated by UT 120h, may include a microphone that can be used to obtain a non-radio frequency signal from a data source device 140. Data source 140 may include a speaker, which may generate a non-audible, non-radio frequency signal, as described herein, and a radio frequency transceiver. A UT capable of obtaining and processing a non-radio frequency signal from a data source device 140 may use information transmitted on the non-radio frequency signal to establish a radio connection with data source device 140 and transmit data to or receive data from data source device 140, as described herein.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
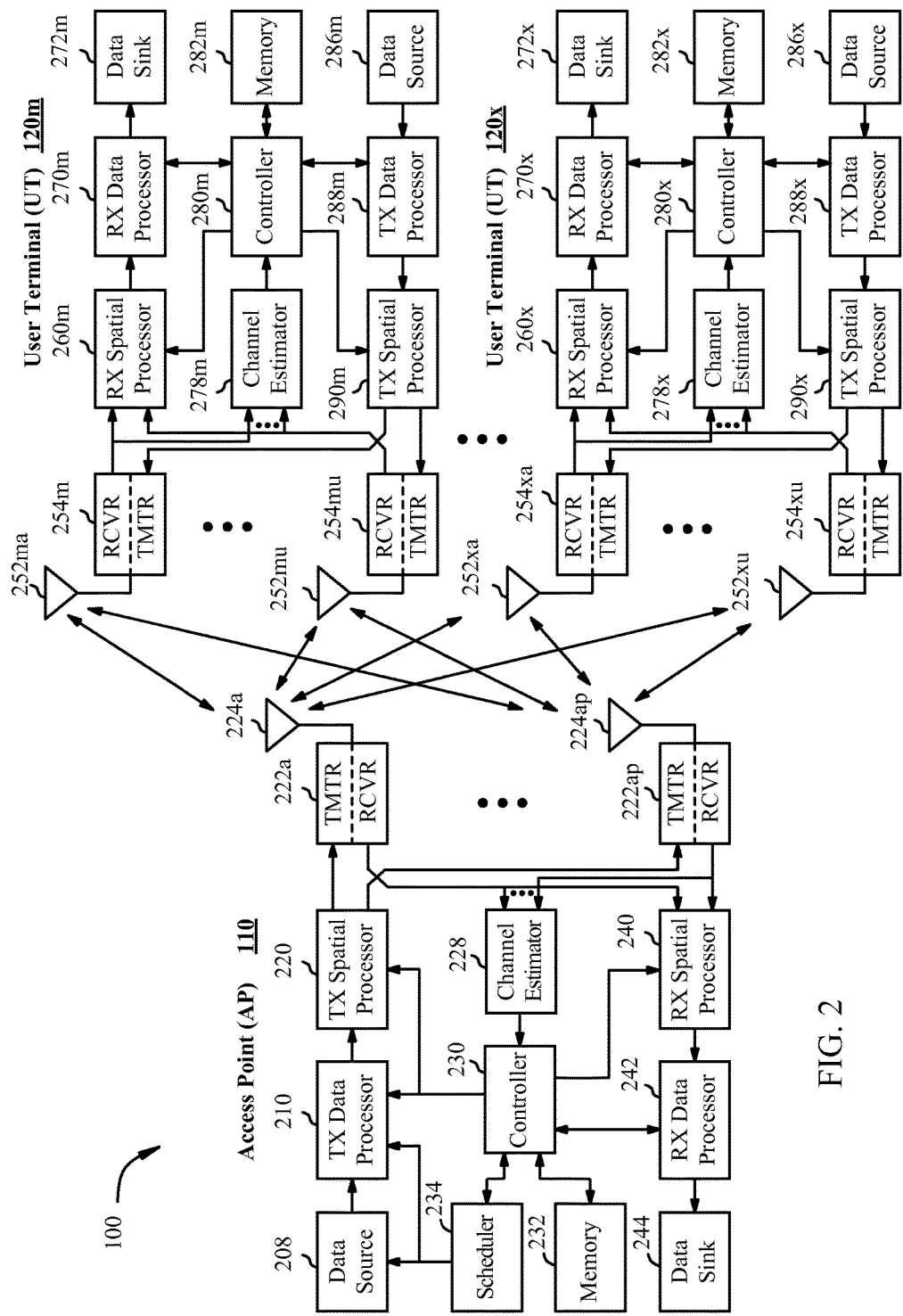
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Example Non-Radio Frequency and Radio Frequency Data Transfer

Aspects of the present disclosure provide techniques for exchanging data using a non-radio frequency signal (e.g., a signal transmitted at an ultrasonic or near-ultrasonic frequency) and using the data to connect with and perform data transfer between devices using a radio access technology. By exchanging data using a non-radio frequency signal, close proximity communications may be achieved without requiring specialized hardware for transmission and reception (e.g., near-field communications (NFC) equipment, such as RFID transmitters and receivers). Rather, a mobile device can discover other devices and/or services provided by other devices using an already-existing microphone to obtain information via a received non-radio frequency signal. Further, by using non-radio frequency signals of a sufficient strength, data transmission between devices may be performed without requiring the devices to be in close proximity (e.g., within 4 inches, as may be required by NFC devices) or in contact with each other.

Figure 3:
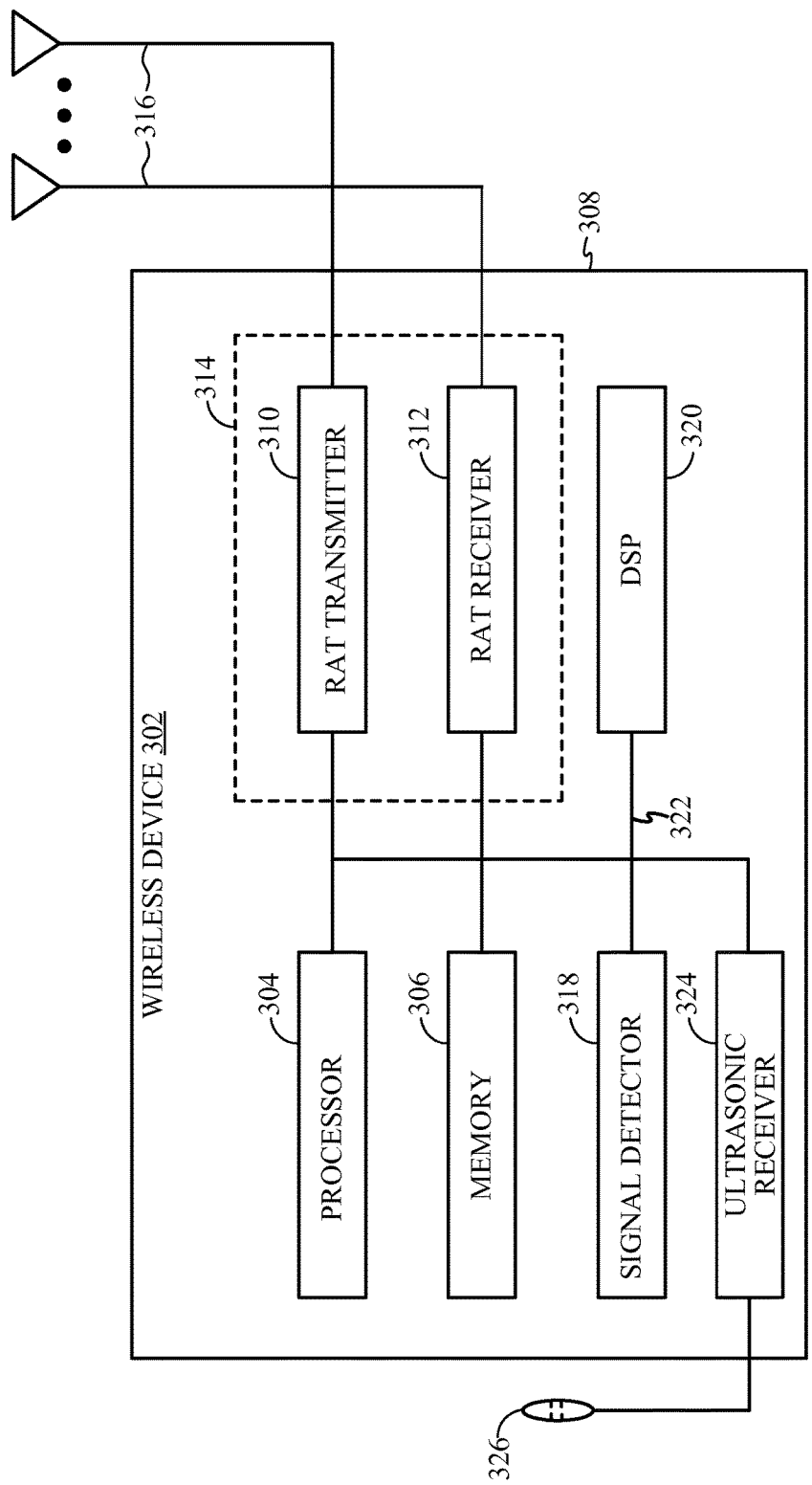
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable (e.g., by processor 304) to implement the methods described herein.

The wireless device 302 may also include a housing 308 that may include a radio frequency (RF) transmitter 310 and an RF receiver 312 to allow transmission and reception of data between the wireless device 302 and a remote location. The transmitter 310 and receiver 312 may be combined into a transceiver 314. In some cases, transceiver 314 may operate at least at a 60 GHz frequency band. In other cases, transceiver 314 may operate on bands used by other radio access technologies (RATs), such as the 900 MHz, 2.4 GHz, or 5 GHz bands. For example, transceiver 314 may operate using a wireless local area network (WLAN) technology. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The wireless device 302 may further include an ultrasonic receiver 324 to allow for the reception of data using non-radio frequency signals from a transmitting device. A microphone 326 may be attached to the housing 308 and electrically coupled to the ultrasonic receiver 324. Microphone 326 may be configured to filter audible and non-audible (e.g., ultrasonic or near-ultrasonic) signals such that signals in an ultrasonic or near-ultrasonic frequency range are routed to ultrasonic receiver 324 for processing, while audible sound is routed to, for example, processor 304 for processing and transmission via RF transmitter 310 (e.g., if wireless device 302 is being used for a voice or video call) or discarded.

The various components of the wireless device 302 may be coupled together by a bus system 322, which may include a power bus, a control signal bus, and a status signal bus in addition to a data bus.

Figure 4:
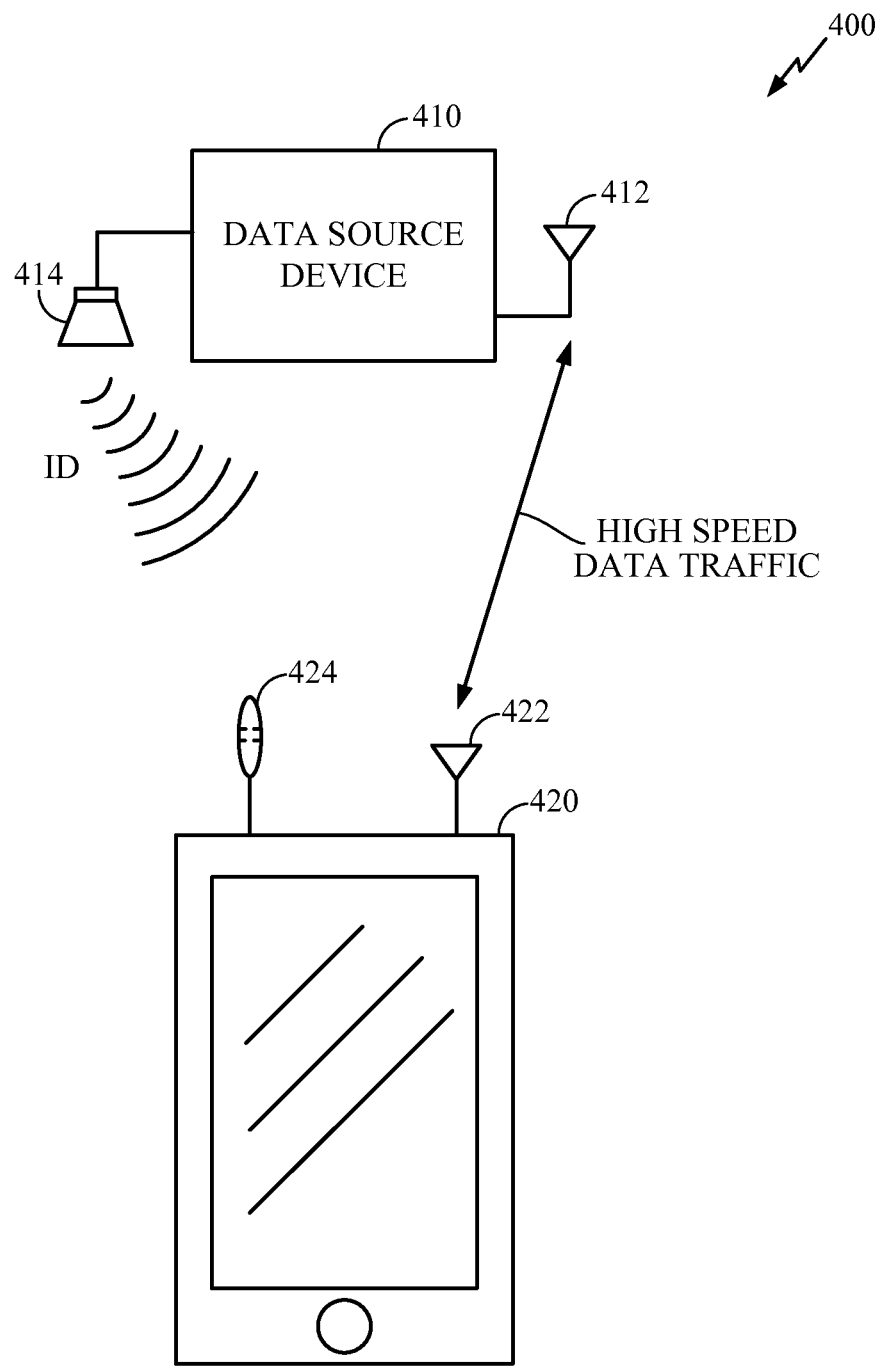
FIG. 4 illustrates example transmitting and receiving devices, in accordance with certain aspects of the present disclosure.

FIG. 4 illustrates an example scenario in which a mobile device can discover other devices and/or information about services provided by other devices, for example, using an already-existing microphone. For example, a microphone can be used to detect signals transmitted at an ultrasonic or near-ultrasonic frequency from other devices. Using the information carried in the signals, a mobile device can connect with a data source and obtain data from the data source using a radio frequency connection.

As illustrated, data source device 410 may include an antenna 412 and a speaker 414. Antenna 412 may be coupled to a radio transceiver used to communicate via a wireless connection. For example, the transceiver may support an 802.11 standard (e.g., 802.11ac, 802.11ad, etc.), a cellular standard (e.g., Long Term Evolution (LTE), LTE-Advanced (LTE-A), or High Speed Packet Access (HSPA), etc.), or other wireless protocols. Speaker 414 may be configured to generate a non-radio frequency signal at a non-audible frequency. In some cases, the signal may be generated at a frequency exceeding 20 kHz (i.e., an ultrasonic signal). In some cases, a non-audible, non-radio frequency signal may be generated at a near-ultrasonic frequency (e.g., between 17 kHz and 20 kHz), which may still be inaudible to humans due to the frequency and sound level of the signal.

Receiver device 420 may be, for example, a mobile phone, a tablet, etc. Receiver device 420 may include an antenna 422 and a microphone 424. Like antenna 412 in data source device 410, antenna 422 may be coupled to a radio transceiver, such as a transceiver supporting an 802.11 standard. Microphone 424 may be configured to record audio data and data in ultrasonic frequencies for processing the receiver device 420.

Receiver device 420 may provide a user interface for a user to select from a list of options provided by data source device 410. As described herein, information about the list of options may be provided from a data source device as part of the information carried on a non-radio frequency signal or from data transferred from data source device 410 after receiver device 420 establishes a connection with data source device 410 (e.g., using an ID obtained via the non-radio frequency signal).

Figure 5:
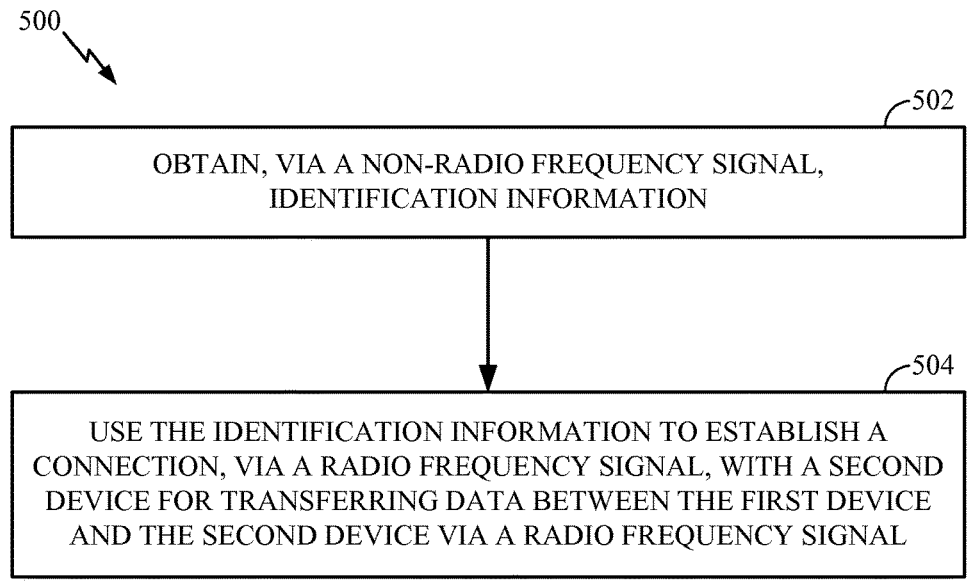
FIG. 5 illustrates a block diagram of example operations for wireless communications by a wireless device, in accordance with certain aspects of the present disclosure.

FIG. 5 illustrates example operations 500 that may be performed by a first device for obtaining information from a second device to initiate a connection with the second device, according to certain aspects of the present disclosure. Operations 500 may begin at 502, where the first device obtains, via a non-radio frequency signal, identification information. At 504, the first device uses the identification information to establish a connection with a second device for transferring data between the first device and the second device via a radio frequency interface (e.g., a WLAN interface).

Figure 6:
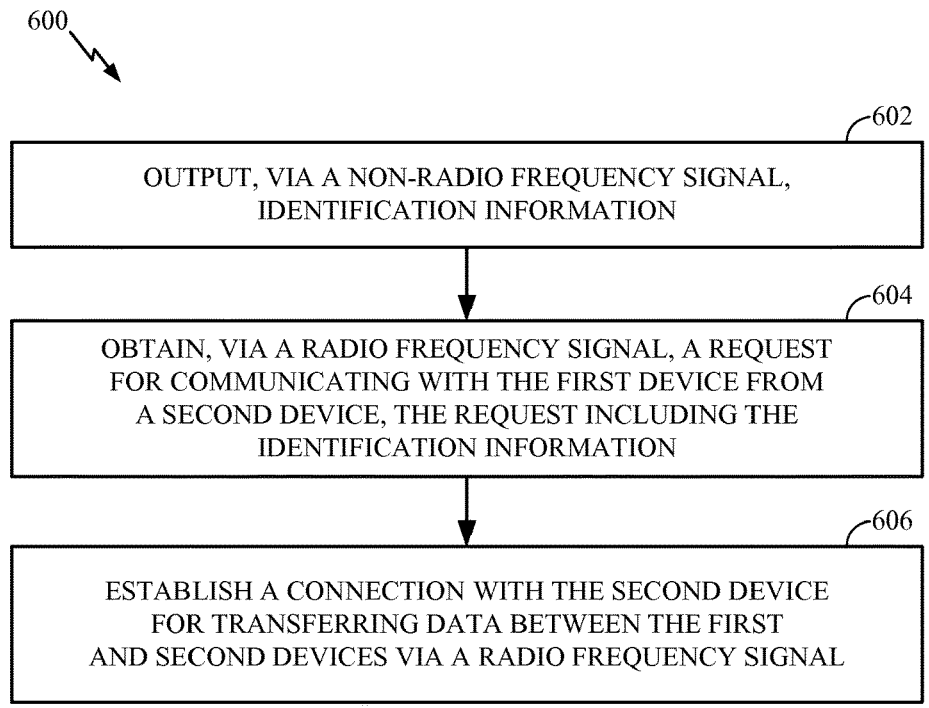
FIG. 6 illustrates a block diagram of example operations for wireless communications by a wireless device, in accordance with certain aspects of the present disclosure.

FIG. 6 illustrates example operations that may be performed by a first device for transmitting information usable by a second device to initiate a connection with the wireless device, according to certain aspects of the present disclosure. Operations 600 may begin at 602, where the first device outputs, via a non-radio frequency signal, identification information. At 604, the first device obtains, via a radio frequency interface, a request for communicating with the first device. The request may include the identification information. At 606, the first device establishes a connection with the second device for transferring data between the first and second devices via the radio frequency interface.

In some cases, the non-radio frequency signal may be modulated orthogonal frequency division multiplexing (OFDM). In other cases, the non-radio frequency signal may be modulated using single carrier frequency division multiple access (SC-FDMA). The modulation may use a low sampling frequency and a small working bandwidth (e.g., for signals transmitted at frequencies between 17 kHz and 20 kHz, a bandwidth of 3 kHz). The non-radio frequency signal may be encoded using a conventional coding scheme, such as a Viterbi+Reed-Solomon scheme, a turbo coding scheme, or a low-density parity check (LDPC) scheme. In some cases, data transmitted using the non-radio frequency signal may be encoded with a code rate of ½; however, data transmitted using the non-radio frequency signal may be encoded with any appropriate code rate. Data transmitted using the non-radio frequency signal may also include an error detection code (e.g., a cyclic redundancy check (CRC) code) that a receiver can use to determine if the data was received correctly.

Figure 7:
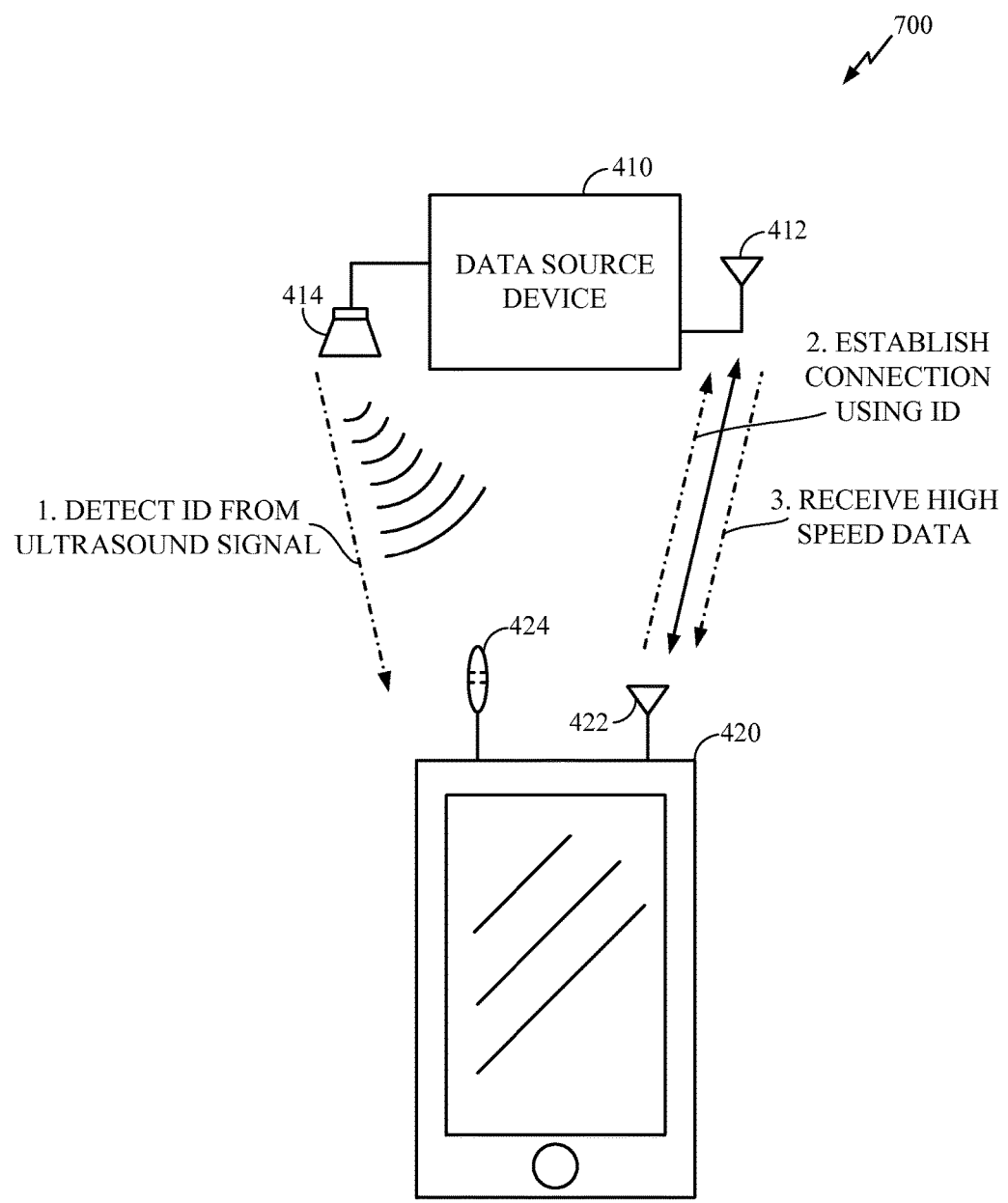
FIG. 7 illustrates example data exchanged between wireless devices, in accordance with certain aspects of the present disclosure.

FIG. 7 illustrates example communications between a data source device and a receiver device, according to certain aspects of the present disclosure. First, a receiver device receives information identifying the data source device via a non-radio frequency signal transmitted from data source device 410 via speaker 414. The non-radio frequency signal may be detected by receiver device 420 via microphone 424 and decoded.

The information transmitted via the non-radio frequency signal may include identification information for the data source device and may provide information usable by the receiver device to set up a wireless connection with the transmitting device. For example, the non-radio frequency signal may include a password that the receiver device can use to set up the wireless connection.

In some cases, the information transmitted via the non-radio frequency signal may include an identification of the transmitting device and additional information. For example, the non-radio frequency signal may carry information about the capabilities of the transmitting device. For example, in a smart lighting scenario, the non-radio frequency signal may include information indicating that a color or brightness of the light can be modified. In a point-of-sale application, the non-radio frequency signal may include information indicating acceptable payment cards or a list of selections of downloadable content (e.g., multimedia content, such as audio, video, or text data; web content, etc.) that a user can choose from.

In some cases, a user may be prompted, through a user interface displayed on receiver device 420, for a selection from a list of selections provided from a data source device 410 via the non-radio frequency signal. Based on the selection, the receiver device can connect with a data source device 410. In some cases, the list of selections may include a list of a particular data source device 410 that receiver device 420 should establish a connection with. In some cases, the list of selections may include a list of content available to be downloaded from a data source device 410.

After receiver device 420 detects and decodes the non-radio frequency signal, the receiver device 420 proceeds to establish a connection using the received identification information with data source device 410 via a message transmitted using a wireless transceiver coupled to antenna 422. The message may be received by antenna 412 coupled to a wireless transceiver at data source device 410. The message may include the identification information received via the non-radio frequency signal.

After connecting with data source device 410, data may be exchanged between data source device 410 and receiver device 420. The data may be transmitted and received via RAT transceivers at data source device 410 and receiver device 420.

A transceiver coupled to antenna 412 at data source device 410 and a transceiver coupled to antenna 422 at receiver device 420 may implement various wireless technologies. In some cases, the implemented wireless technology may comprise a wireless local area network (WLAN) technology (e.g., 802.11n, 802.11ac, 802.11ad, etc.). In some cases, the implemented wireless technology may comprise a wireless technology operating at least at a 60 GHz frequency band.

In some cases, a user interface displayed on receiver device 420 may be used to provide acknowledgment prior to transferring data between data source device 410 and receiver device 420. For example, if the non-radio frequency signal includes a list of options for a user to select from, a user interface may request a selection of at least one of the options from the list of options via the user interface before transferring data corresponding to the selected at least one of the plurality of options from data source device 410. For example, if a point of sale system provides a gateway for downloading multimedia content, such as one of a plurality of movies, the user interface may display a list of the multimedia content that a user can download from data source device 410. When a user selects an option, receiver device 420 may communicate the selected choice to data source device 410 and initiate transfer of the selected multimedia content.

In some cases, the receiver device may use the identification information to retrieve and/or transmit additional information via the wireless interface prior to allowing the user to provide acknowledgment prior to the transferring of data between data source device 410 and receiver device 420. For example, the additional information may include payment information associated with the user. In one example, previously stored payment information may be retrieved from data source device 410, and a user can confirm that the payment information is to be used to purchase multimedia content. Alternatively, the user can provide new payment information to data source device 410 before performing a selection of the multimedia content to be purchased using the new payment information.

In some cases, the receiver device may receive, via the wireless interface, information about a list of options that a user can select from after the receiver device establishes a connection with data source device 410 using the identification information received from a non-radio frequency signal. The receiver device may display information about the options to a user via a user interface and receive a selection of at least one option from the list of options.

In some cases, the receiver device may use information about the selection of the at least one option to initiate transfer of the appropriate data from a data source device 410. For example, the receiver device may connect with a data source device 410 and receive, via the wireless interface, a list of multimedia content available to be downloaded from data source device 410 via the wireless interface. After displaying the list on a user interface and receiving a selection, the receiver device can request that data source device 410 transmit data associated with the selection to the receiver device.

Figure 5A:
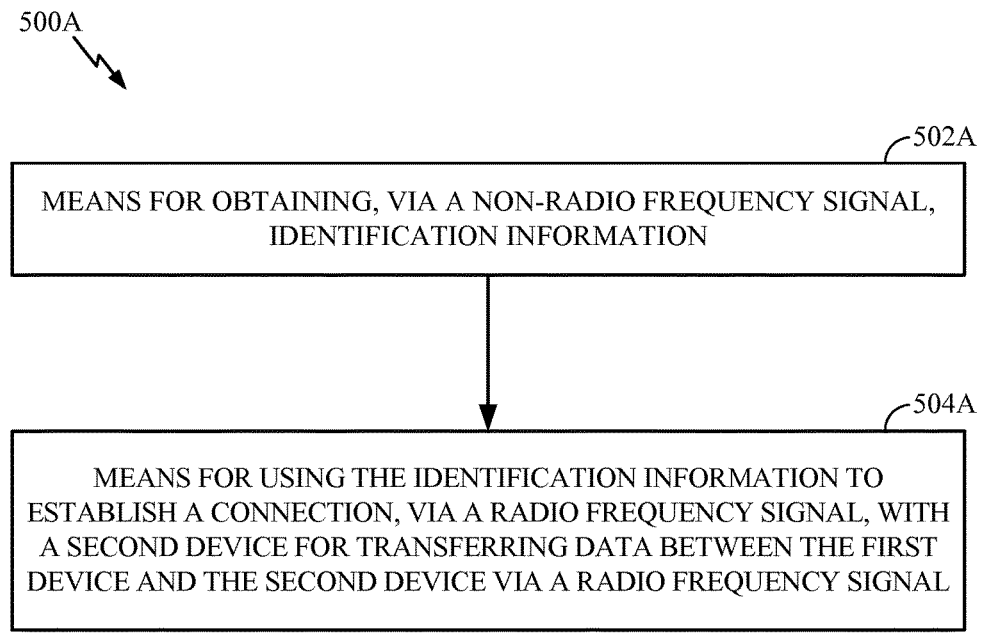
FIG. 5A illustrates example means capable of performing the operations shown in FIG. 5.
Figure 6A:
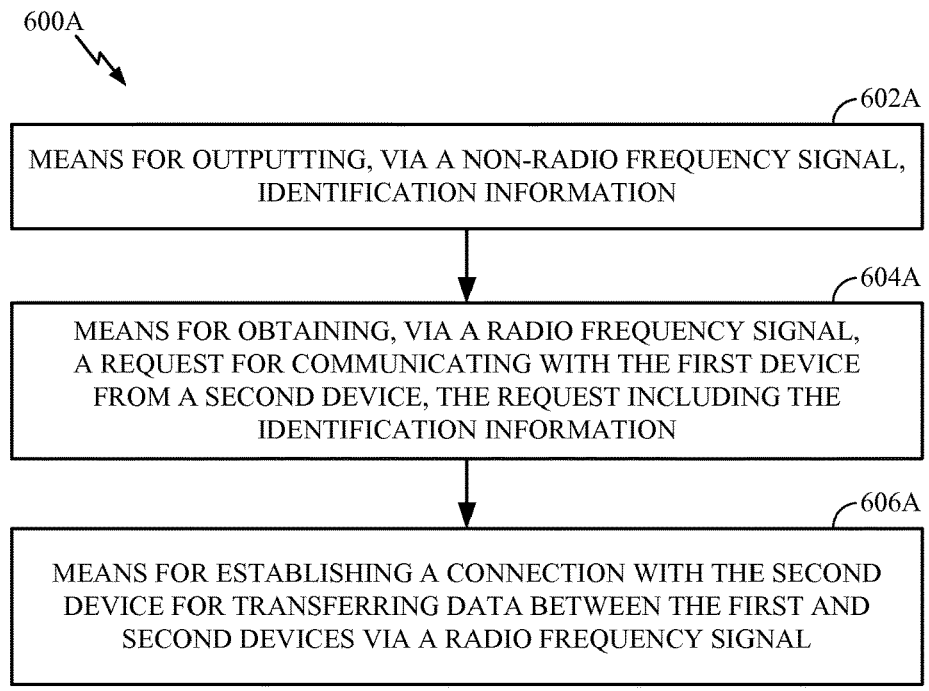
FIG. 6A illustrates example means capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500, and 600 illustrated in FIGS. 5 and 6 correspond to means 500A and 600A illustrated in FIGS. 5A and 6A, respectively.

For example, means for transmitting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for processing, means for determining, means for detecting, means for scanning, means for selecting, or means for terminating operation may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions) described above for performing fast association. For example, means for using identification information to establish a connection with a second device via a radio frequency interface (e.g., a WLAN interface) may be implemented by a processing system performing an algorithm that uses the identification information to generate one or more messages to establish a connection via the radio frequency interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A first device for wireless communications, comprising:
   a first interface configured to obtain, via a non-radio frequency signal, identification information and information indicating one or more capabilities of a second device;
   a second interface configured to communicate via a radio frequency signal;
   a third interface configured to obtain a selection of one or more of the indicated one or more capabilities of the second device; and
   a processing system configured to:
   use the identification information and the selected one or more of the indicated capabilities of the second device to establish a connection with the second device, via the second interface; and
   transfer data, based at least in part on the selected one or more capabilities of the second device, between the first and second devices via the second interface.

2. The first device of claim 1, wherein the second interface comprises a wireless local area network (WLAN) interface.

3. The first device of claim 1, wherein the second interface operates at least at a 60 GHz frequency band.

4. The first device of claim 1, wherein the third interface is further configured to allow
   a user to provide acknowledgement prior to the transfer of data between the first and second devices.

5. The first device of claim 4, wherein:
   the processing system is configured to use the identification information to retrieve additional information via the second interface, prior to allowing the user to provide acknowledgement.

6. The first device of claim 5, wherein the additional information comprises payment information associated with the user.

7. The first device of claim 1, wherein the non-radio frequency signal comprises a signal obtained at an ultrasonic frequency.

8. The first device of claim 1, wherein the data comprises multimedia content.

9. The first device of claim 1, wherein the first interface is further configured to obtain information regarding multimedia content available via the connection.

10. The first device of claim 1, further comprising a receiver, wherein the first interface is configured to communicate using the at least one receiver, and wherein the first device is configured as a wireless station.

11. A first device for wireless communications, comprising:
    a first interface configured to output identification information and information indicating one or more capabilities of the first device for transmission via a non-radio frequency signal;
    a second interface configured to obtain, via a radio frequency signal, a request for communicating with the first device, the request including the identification information and one or more capabilities selected from the indicated one or more capabilities of the first device; and
    a processing system configured to:
    establish a connection with a second device, via the second interface; and
    transfer data, based at least in part on the information indicating the one or more capabilities of the first device and the selected one or more capabilities of the first device, between the first and second devices via the second interface.

12. The first device of claim 11, wherein the second interface comprises a wireless local area network (WLAN) interface.

13. The first device of claim 11, wherein the second interface operates at least at a 60 GHz frequency band.

14. The first device of claim 11, wherein the non-radio frequency signal comprises an ultrasonic signal.

15. The first device of claim 11, wherein the data comprises multimedia content.

16. The first device of claim 11, wherein the first interface is further configured to output information regarding a list of multimedia content available via the connection for transmission.

17. The first device of claim 11, further comprising a receiver, wherein the first interface is configured to communicate using the at least one receiver, and wherein the first device is configured as a wireless station.

18. A method for wireless communications by a first device, comprising:
    obtaining, via a non-radio frequency signal, identification information and information indicating one or more capabilities of a second device;
    using the identification information to establish a connection with the second device via a radio frequency interface;
    obtaining a selection of one or more of the indicated one or more capabilities of the second device;
    using the identification information and the selected one or more of the indicated capabilities of the second device to establish a connection with the second device, via the radio frequency interface; and
    transferring data, based at least in part on the information indicating the one or more capabilities of the second device and the selected one or more capabilities of the second device, between the first and second devices via the radio frequency interface.

19. The method of claim 18, wherein the radio frequency interface comprises wireless local area network (WLAN) interface.

20. The method of claim 18, wherein the radio frequency interface operates at least at a 60 GHz frequency band.

21. The method of claim 18, further comprising:
allowing a user to provide an acknowledgement prior to the transfer of data between the first and second devices.

22. The method of claim 18, wherein the non-radio frequency signal comprises a signal obtained at an ultrasonic frequency.

23. The method of claim 18, wherein the data comprises multimedia content.

24. The method of claim 18, further comprising:
obtaining information, via a non-radio frequency signal, regarding multimedia content available via the radio frequency interface.

25. A method for wireless communications by a first device, comprising:
outputting identification information and information indicating one or more capabilities of the first device for transmission via a non-radio frequency signal;
obtaining via a radio frequency interface, a request for communicating with the first device, the request including the identification information and one or more capabilities selected from the indicated one or more capabilities of the first device;
establishing a connection with a second device, via the radio frequency interface; and
transferring data, based at least in part on the information indicating the one or more capabilities of the first device and the selected one or more capabilities of the first device, between the first and second devices via the radio frequency interface.

26. The method of claim 25, wherein the radio frequency interface comprises a wireless local area network (WLAN) interface.

27. The method of claim 25, wherein the radio frequency interface operates at least at a 60 GHz frequency band.

28. The method of claim 25, wherein the non-radio frequency signal comprises an ultrasonic signal.

29. The method of claim 25, wherein the data comprises multimedia content.

30. The method of claim 25, further comprising:
outputting information, via a non-radio frequency signal, regarding a list of multimedia content available via the connection for transmission.

\* \* \* \* \*